United States Patent

[11] 3,634,855

[72] Inventor Wendell S. Miller
1341 Comstock Ave., Los Angeles, Calif. 90024

[21] Appl. No. 821,788
[22] Filed May 5, 1969
[45] Patented Jan. 11, 1972

[54] SELF-CLOCKING MULTILEVEL DATA CODING SYSTEM
2 Claims, 5 Drawing Figs.

[52] U.S. Cl. ........ 340/347 DD, 325/38 A, 340/174.1
[51] Int. Cl. ........ H03k 13/24, G06f 5/00, H03k 13/252
[50] Field of Search ........ 340/347 DD, 174.1 G; 325/38.1 A; 178/66, 18; 179/15 BW, 15 AP

[56] References Cited

UNITED STATES PATENTS

| | | | |
|---|---|---|---|
| 3,157,740 | 11/1964 | Crafts | 178/66 |
| 3,188,520 | 6/1965 | LaBeaume | 235/92 X |
| 3,226,685 | 12/1965 | Potter et al. | 340/174.1 X |
| 3,330,909 | 7/1967 | Willson | 178/66 X |
| 3,348,149 | 10/1967 | Crafts et al. | 178/66 X |
| 3,393,364 | 7/1968 | Fine | 325/38 |
| 3,281,806 | 10/1966 | Lawrence et al. | 340/174.1 G X |
| 3,354,463 | 11/1967 | Larsen | 340/174.1 G X |
| 3,518,700 | 6/1970 | Kimura et al. | 340/174.1 G X |

*Primary Examiner*—Maynard R. Wilbur
*Assistant Examiner*—Michael K. Wolensky
*Attorney*—William P. Green

ABSTRACT: A data processing system in which a series of data bits of two or more different types are coded as changes in state of a recording or transmission medium or the like, with there being three or more of the specified changes in state, and with the coding apparatus being operable in each data cell to adopt a coding pattern which utilizes a selected plurality but not all of the mentioned states to represent the different types of data bits, and with the coding pattern for each data cell being so selected as to avoid use in each cell of the same one of said states which was actually produced in the preceding cell. As a result, there must be a change of state in each data cell, which change in state may be employed as a self-clocking signal.

| A | B | C | D | E | F | G | H | |
|---|---|---|---|---|---|---|---|---|
| | 1 | 2 | 3 | 4 | 5 | 6 | 7 | 104 |
| 4 | 5 | 6 | 7 | | 1 | 2 | 3 | 105 |
| 6 | 7 | | 1 | 2 | 3 | 4 | 5 | 106 |

WENDELL S. MILLER
INVENTOR.
BY William P. Green
ATTORNEY

WENDELL S. MILLER
INVENTOR.

BY William P. Green
ATTORNEY

SELF-CLOCKING MULTILEVEL DATA CODING SYSTEM

BACKGROUND OF THE INVENTION

This invention relates to improved apparatus and methods for coding a series of data bits in data processing equipment. The invention will be described primarily as applied to equipment for first recording a series of data bits in coded form, and subsequently reading back the record track to reproduce the bits in decoded form. However, it is contemplated that the invention is its broadest aspects may also be applied to data processing equipment in which the bits are not necessarily recorded, but rather are coded merely for transmission or other purposes, as, for instance, in telephone or telemetry equipment or the like.

A number of different data-coding systems have been proposed in the past in which incoming signals representing different types of data bits, for example, ones and zeros, have been represented or coded as changes in state of a controlled unit, as, for instance, between positive and negative electrical polarities, between different magnetic states, etc. For example, in the simple 'return-to-zero' (RZ) system, each data bit is represented as a single positive or negative electrical pulse, which returns to zero potential at the end of the pulse. In the 'non-return-to-zero' system (NRZ), the potential changes from negative to positive, or vice versa, for each bit, but does not then return to zero until the next successive bit. This latter system has the advantage of reducing the number of changes in state required per bit, but has several decided disadvantages, including an inherent difficulty in distinguishing between successive bits of like type, as well as an inability to attain self-clocking in a single record or information track, and other problems which prevent effective transmission and bit segregation at high bit densities. To overcome the disadvantages of these simple coding systems, there have been proposed and utilized certain more complex arrangements in which two pulses have been employed to represent a single bit in each data cell, as in the phase shift method, and in the frequency-doubling method. These arrangements avoid pulse crowding problems, and related difficulties, in high-density recording and transmission apparatus, and can attain self-clocking, but have the disadvantage of necessitating too many changes of state to represent each bit, and therefore cannot achieve as high a bit density on a record or transmission track as would be desired.

SUMMARY OF THE INVENTION

The present invention provides an improved coding and decoding system which allows for a greatly increased and essentially maximized bit density in a record or information track, in a manner avoiding the disadvantages of all of the prior coding systems of which I am aware, including those specifically discussed above. In apparatus utilizing the present coding and decoding procedure, each data bit may be and preferably is represented as a single significant change in state of the record or transmission medium or the like, that is, a change from one significant state to another without return to the first state until the next bit. At the same time, preferably no bit is at any point represented without such a change in state, to thereby avoid the pulse crowding and other difficulties which necessarily follow when a series of bits can be represented without individual changes in state, with resultant difficulty in differentiating between successive bits and in attaining self-clocking of the track. In data processing apparatus employing my coding and decoding system, the single change in state of the recording or transmission medium for each bit may be utilized very effectively and easily for developing a clocking signal enabling a single record or information track to be completely and automatically self-clocking.

To achieve the above-discussed results, the apparatus or unit which changes in state is so designed that the number of states to which it is actuable is at least one greater than the number of different types of data bits to be coded, so that in each bit cell a code pattern may be employed which uses some but not all of the different changes in state to represent the different types of bits respectively. The coding and decoding equipment is then constructed to select in each data cell a coding pattern which does not utilize as representative of any of the different types of bits the same state of the recording or other medium which was actually produced in the preceding bit cell. In this way, I require a change in state for each cell, to avoid pulse crowding and similar effects, and to allow for self-clocking if desired. In my presently preferred form of the invention, the changes in state which represent in coded form the different data bits are produced by employment of frequency-modulated signals of a plurality of different frequencies, so that these frequencies may then be separated out by the decoding equipment to produce corresponding representations of the data bits in decoded form.

BRIEF DESCRIPTION OF THE DRAWING

The above and other features and objects of the invention will be better understood from the following detailed description of the typical embodiments illustrated in the accompanying drawings, in which.

DESCRIPTION OF THE PREFERRED EMBODIMENTS

Figures 1, 3, 4:
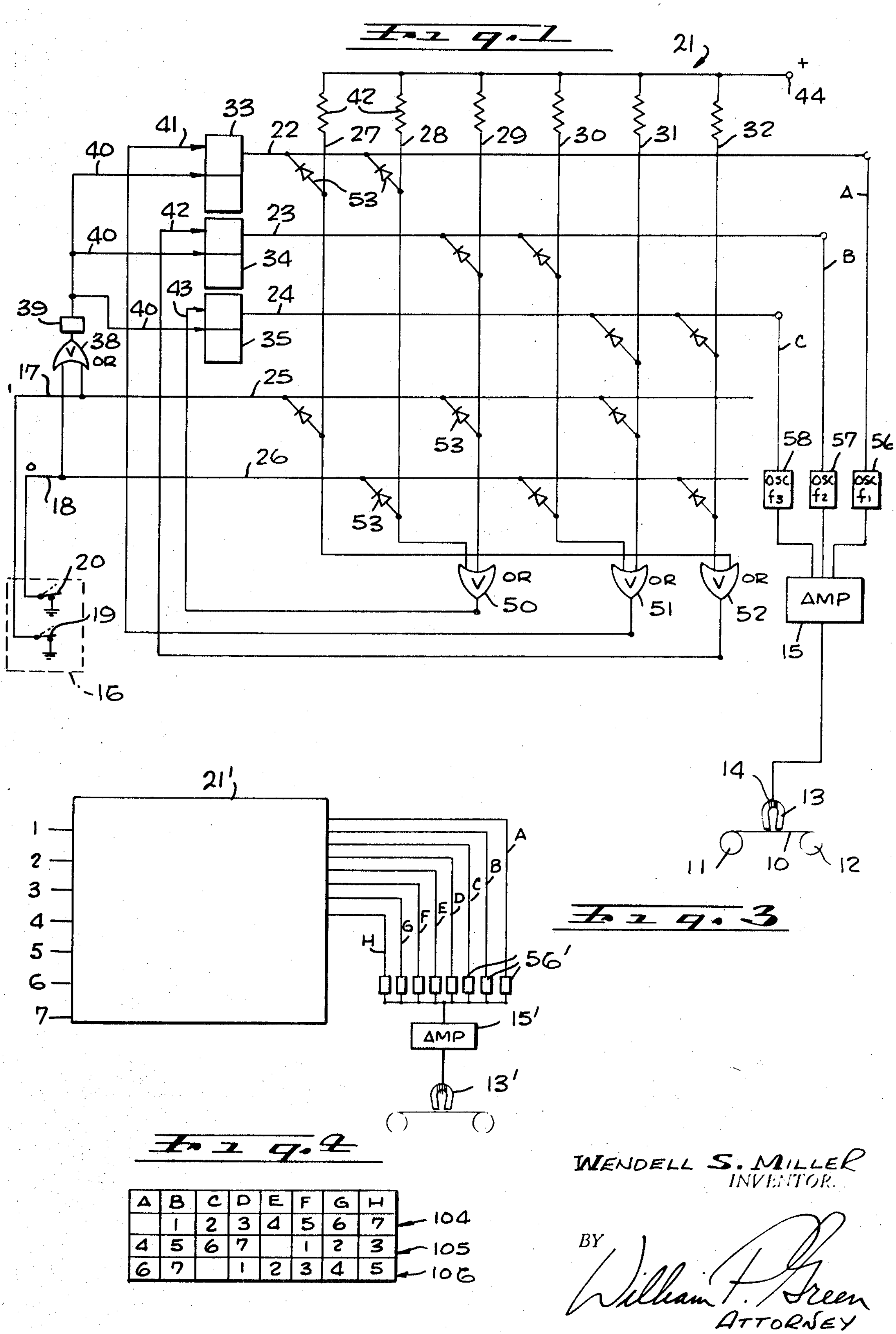
FIG. 1 is a diagrammatic representation of a data coding and recording system embodying the invention.
FIG. 3 shows diagrammatically and in simplified form a variational coding arrangement similar to that of FIG. 1, but adapted to handle more different types of data bits.
FIG. 4 is a chart representing the changing code significance of the different output lines in FIG. 3.

Referring to FIG. 1, I have shown in that figure the circuit of a system for recording a series of bits of information in coded form on a magnetic record track 10 which is advanced at a uniform rate between a pair of motor-driven tape reels 11 and 12. A conventional magnetic recording head 13 has its coil 14 energized by an electrical signal from an amplifier 15, which signal changes in state between a plurality of different frequency modulated conditions, as will appear as the present description progresses.

The information to be coded and recorded is supplied to the circuit of FIG. 1 as input signals from an appropriate information supply circuit 16, such as a suitable computer circuit, delivering the input signals on two different input lines 17 and 18, typically representing ones and zeros respectively. The input signals on these two lines may be of any appropriate type, such as positive or negative electrical pulses from source 16, but in the particular arrangement illustrated are typically assumed to be in the form of actuations of a pair of grounding switches 19 and 20 in circuit 16. More particularly, switch 19 may normally close a circuit from line 17 to ground, with the opening of this circuit for a short time T representing the delivery to line 17 of a 'one' input signal. Similarly, switch 20 may normally connect line 18 to ground, and be opened for the same short time T to indicate the delivery of a zero to the apparatus.

The coding apparatus of FIG. 1 includes a diode matrix 21, which functions as a number of AND circuits acting to convert the input signals to coded form in accordance with a number of different coding patterns utilizing output pulses on three lines A, B and C. The diode matrix, which desirably takes the form of an integrated circuit of small dimension, is illustrated as having a series of five horizontal lines 22, 23, 24, 25 and 26, and a series of six vertical lines 27, 28, 29, 30, 31 and 32. Two of the horizontal lines, specifically lines 25 and 26, are connected directly to the previously mentioned input lines 17 and 18 from data source 16. The other three horizontal lines 22, 23 and 24 of the matrix are connected to the output side of three flip-flops or multivibrators 33, 34 and 35. As indicated in FIG. 1, these outputs from the flip-flops 33, 34 and 35 produce signals in lines 22, 23 and 24 when the respective flip-flops are in their upper or high states, with those signals preferably being indicated by opening connections between lines 22, 23 and 24 and ground within the flip-flops. That is, lines 22, 23 and 24 are normally connected to ground through the flip-flops, but with each of these lines being disconnected from ground whenever the associated flip-flop is actuated to its higher state.

A delayed clocking signal is supplied to each of the flip-flops 33, 34 and 35 each time an input signal representing a one or zero is supplied to the matrix 21 through line 17 or 18. Incoming bit signals on lines 17 or 18 are applied to an OR-circuit 38 which then energizes a delay circuit 39, which supplies the desired clocking signals through lines 40 to the flip-flops, in delayed relation to the delivery of each data bit to the matrix 21 through line 17 or 18. Each clocking signal actuates to its higher state one of the flip-flops 33, 34 or 35, specifically whichever flip-flop is then receiving a signal through an associated line 41, 42 or 43; while the same clocking signal actuates the other two flip-flops to their lower states. The delay caused by element 39 should be greater than the propagation time of a signal from line 17 or 18 through the matrix 21 and the later-to-be-discussed OR-gates 50–52 to lines 41, 42 or 43, but less than the previously defined time T, so that the delayed pulse on the lines 40 will arrive at the flip-flops while the newly energized line 41, 42 or 43 is high.

The three flip-flops 33, 34 and 35 act in effect, for each input signal, to select the particular coding pattern which is to be utilized for that signal. More specifically, the three lines 22, 23 and 24 from the flip-flops represent three different coding patterns, one of which is selected for each bit cell by actuation of the associated flip-flop to its upper state, to disconnect the corresponding line 22, 23 or 24 from ground. As will appear at a later point, these flip-flops are actuated, for each cell, in correspondence with the output signal actually produced in the preceding bit cell, in a manner avoiding repetition of the same output signal or state in two successive cells.

The six vertical lines 27 through 32 of diode matrix 21 in FIG. 1 are connected by five individual load resistors 42 to the positive terminal 44 of a direct current power source whose negative terminal is connected to ground. Each of the vertical lines is connected at its lower end to one of the three OR-circuits 50, 51 and 52, and is also connected by two diodes 53 to one of the flip-flop lines 22, 23 or 24, and to one of the two input lines 25 or 26. For example, the left-hand vertical line 27 is connected by a first diode to line 22 from flip-flop 33, and by a second diode to line 25 leading to data source 16. Similarly, the second vertical line 28 is connected through one diode to line 22, and through a second diode to line 26. Each of the vertical lines and the two associated diodes (and related circuitry) form together an AND circuit, which delivers a positive electrical signal (logically, true) to the corresponding OR-circuit 50, 51 or 52 only when the two horizontal lines to which the vertical line is connected by diodes are both disconnected from ground. In the case of the left-hand vertical line in the diode matrix of FIG. 1, current flows to ground from that vertical line through one or both of the connected diodes 53 so long as either of the lines 22 or 25 is grounded. Only when both of these lines are disconnected from ground at the same time is the positive potential at 44 communicated to the associated OR-circuit 52 by line 27. Similarly, the other vertical lines actuate their associated OR-circuit 50, 51 or 52 only when both ground connections from a particular line through the associated diodes are broken at the same time. The vertical lines are connected to the OR-circuits 50, 51 and 52 in pairs, in the relation illustrated in FIG. 1.

The outputs in lines 41, 42 and 43 from the OR circuits represent in coded form the information originally received on lines 17 and 18. For each bit received on line 17 or line 18, only one of the three lines 41, 42 or 43 is energized. Such energization of line 41, 42 or 43 supplies a signal to the associated flip-flop 33, 34 or 35 which conditions that flip-flop to be actuated to its higher state upon receipt of the delayed clocking signal through line 40. Such actuation provides a coded output on one of lines A, B or C representing the value of the digit input on line 17 or 18 in view of the next previous input digit. It also thereby selects a coding pattern for the next successive bit cell in accordance with the particular state to which the lines A, B and C are actuated. If the coded output signal for a particular bit cell consists of actuation of line A to its ungrounded or actuated condition, this serves to automatically select the coding system associated with horizontal line 22 of the matrix for the next cell. This coding system utilizes only the two left-hand vertical lines 27 and 28 of FIG. 1, so that if the next input signal is a one, the next coded output will constitute energization of lines 27 and 42, to condition flip-flop 34 for actuation on the next clocking signal. Conversely, if the input signal is a zero, lines 28 and 43 will be energized to condition flip-flop 35 for actuation on the next clocking signal.

Similarly, if any particular first cell results in energization of line B or line C, the coding system automatically adopted for the next cell will be one in which the particular line B or C previously in use will have no significant value and will not be employed. Therefore, each input signal requires a change in state of the lines A, B, and C, from a starting condition in which one of those lines is energized to a changed condition in which another of the lines is energized.

Figures 2, 5:
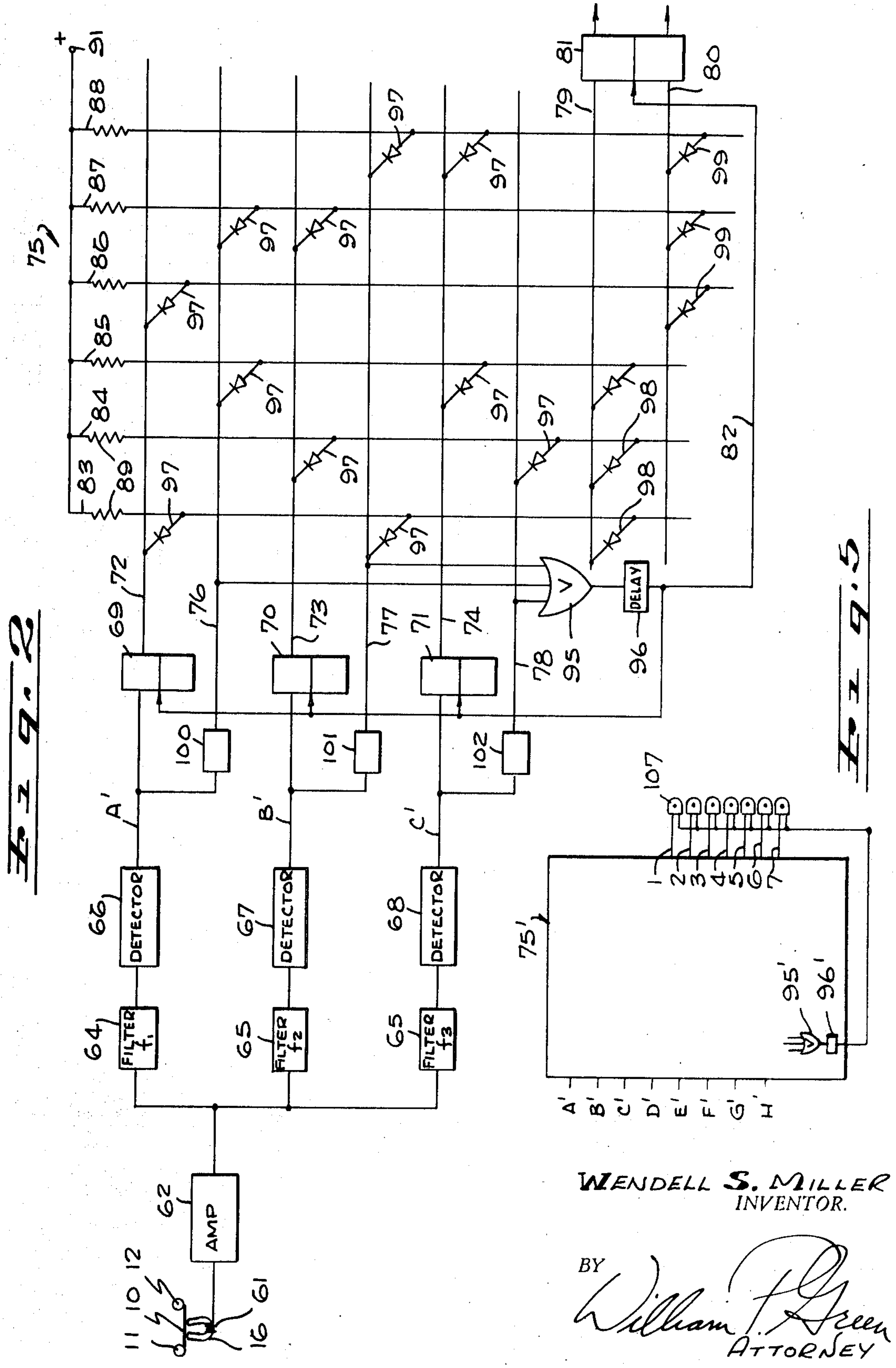
FIG. 2 is a diagram showing the circuit of a system which may be used for playing back and decoding the information recorded in FIG. 1.
FIG. 5 is a simplified view similar to FIG. 3, but showing the decoding or playback apparatus for reading back a record produced by the apparatus of FIG. 3.

The outputs from lines A, B and C can be utilized in any convenient manner for recording or transmission purposes, or otherwise, and can be ultimately decoded in apparatus similar to that shown in FIG. 2. In FIG. 1, it is typically assumed that the signals in lines A, B and C are to be employed for controlling the delivery to amplifier 15 of alternating current signals at three different frequencies $f_1$, $f_2$ and $f_3$ respectively from three oscillators 56, 57 and 58 respectively. Thus, whenever line A is energized, oscillator 56 supplies to amplifier 15 and to recording head 13 a signal at frequency $f_1$, which continues until line A is deenergized (and line B or C is energized). Similarly, energization of line B or line C produces a signal at frequency $f_2$ or $f_3$ so long as the line remains energized, to in this way convert the amplifier and recording head between three different states representing the input signals in coded form. The magnetic tape 10 changes between three corresponding states of frequency modulation insofar as the magnetically recorded signal on the tape is concerned.

To now recapitulate briefly the operation of the circuitry of FIG. 1, assume first of all that a 'one' signal is applied to input line 17, by opening of its switch 19, while the switch 20 associated with input line 18 remains closed to ground. Also, assume that flip-flops 33 and 34 are in their lower state, in which their associated lines 22 and 23 are connected to ground through the flip-flops, and that flip-flop 35 is in its higher state, in which line 24 is disconnected from ground. Since both of the lines 24 and 25 are thus ungrounded, the positive voltage at 44 is communicated through vertical line 31 to OR-circuit 51, and then through line 41 to flip-flop 33, so that after a predetermined slight delay interval following receipt of the input on line 17, this flip-flop 33 is actuated by lines 40 and 41 to its higher state, while the other two flip-flops are returned to or remain in their lower states. Thus line 22 is disconnected from ground while lines 23 and 24 are connected to ground, and a resulting signal is produced in line A causing delivery to amplifier 15 of an output signal from oscillator 56 at frequency $f_1$. Energization of line 22 also causes adoption of the coding pattern associated with that line 22 for the next successive bit cell. It will be noted that the two vertical lines which are connected by diodes to the code-selecting horizontal line 22 are lines 27 and 28, which are connected at their lower ends into OR-circuits 52 and 50 respectively, and not into the same OR-circuit 51 that was utilized in the preceding bit cell, to thus employ for the next cell a code pattern which assigns lines 23 and 24 (connected to lines B and C) as corresponding to input lines 17 and 18 respectively, and does not utilize the same line 22 (connected to line A) on which the previous change of state was produced. Thus, each incoming signal requires one and only one change in state of the output circuitry, so that the changes in state can be responded to by the apparatus of FIG. 2 as a clocking signal indicating arrival of successive data bits.

To discuss now the decoding and playback apparatus of FIG. 2, a magnetic playback head is illustrated at 16 in that figure, and responds to the different states of frequency modulation of tape 10 as it is advanced at a uniform rate by reels 11 and 12. Coil 61 of head 16 supplies a readout signal through amplifier 62 to three filters 63, 64 and 65, adapted to pass only the frequencies $f_1$, $f_2$ and $f_3$ respectively, which are then detected by detectors 66, 67 and 68. The output in line A′ from detector 66 gives a signal in that line whenever the signal recorded on tape 10 is at the frequency $f_1$, to thus correspond to the signal supplied to line A in FIG. 1. In the same manner, a signal in line B′ of FIG. 2 corresponds to a signal in line B of FIG. 1, and a signal in line C′ of FIG. 1 corresponds to a signal in line C of FIG. 1.

Three flip-flops 69, 70 and 71 record temporarily during each bit cell the particular one of the lines A′, B′ or C′ which was last activated, to thus automatically select a coding pattern corresponding to that adopted in the same cell by the circuitry of FIG. 1, and more specifically a pattern which will not utilize the same coded change in state for two successive cells, thereby requiring one change in state for each cell. The output lines 72, 73 and 74 from the three flip-flops are three of eight horizontal lines in an integrated circuit diode matrix 75 of the same general type as circuit 21 in FIG. 1. Of the other horizontal lines, the three designated 76, 77 and 78 are connected to the previously mentioned lines A′, B′ and C′ through differentiating circuits 100, 101 and 102 respectively, each of which is designed to break a ground connection to the associated line 76, 77 or 78 upon activation of the connected line A′, B′ or C′. The lower two horizontal lines 79 and 80 in FIG. 2 form two OR circuits, whose energization conditions an output flip-flop 81 for actuation to its upper or lower state respectively (to indicate ones and zeros respectively) upon receipt of a clocking signal through a line 82.

The six vertical lines 83, 84, 85, 86, 87 and 88 of matrix 75 are connected by individual load resistors 89 to the positive voltage terminal 91 of a direct current power source, whose negative side is connected to ground. When flip-flops 69, 70 and 71 are in their lower states, they connect their associated lines 72, 73 and 74 to ground, with these ground connections being broken when each of the flip-flops is actuated to its higher state.

Each time that an input signal (change of state) is received on any of the lines A′, B′ or C′, that signal acts through an OR-circuit 95 and a delay circuit 96 to supply a delayed clocking or actuating pulse to each of the flip-flops 69, 70 and 71, and through line 82 to the flip-flop 81. As in the case of delay circuit 39 of FIG. 1, the delay introduced by circuit 96 of FIG. 2 is shorter in duration than a bit cell, to actuate the flip-flops to a changed condition after each bit has produced an appropriate signal in line 79 or 80 leading to flip-flop 81 but before the next change of state of lines A′, B′ and C′. The various diodes 97, 98 and 99 connecting the vertical lines of the matrix with its horizontal lines form AND circuits and OR circuits for properly decoding the information from lines A′, B′ and C′ to one and zero information at the output side of flip-flop 81. In particular, the two upper diodes 97 associated with each vertical line 83, 84, 85 etc. form together an AND circuit which give that vertical line a positive potential when the ground connections to both of those diodes are broken. This positive signal is communicated through one of the diodes 98 to the one-indicating line 79, or through one of the diodes 99 to the zero-indicating line 80, to appropriately actuate flip-flop 81 upon receipt of the next successive clocking signal through line 82. After a sufficient very short interval has been allowed for response of the AND circuits, and the OR circuits formed by lines 79 and 80 and diodes 98 and 99, delay circuit 96 actuates the flip-flops 69, 70 and 71 to adopt a new code pattern, which will not utilize in its coding system the particular one of the lines A′, B′ or C′ which was actually activated in the preceding cell. Flip-flop 81 is of a character such that it reads out one bit upon each energization of clocking line 82, so that the changes in state of lines A′, B′ and C′ are utilized to control the delivery of output bits from flip-flop 81, to thereby produce one and only one output bit for each change in state of lines A′, B′ and C′, and the controlling circuitry.

In discussing the operation of the FIG. 2 apparatus, assume at the outset that the signal played back from tape 10 is modulated with a signal of frequency $f_1$, and that there is consequently an output signal in line A′. Also, it may be assumed that, for example, flip-flop 70 is in its higher state, while the other two flip-flops 69 and 71 are in their lower states. Thus, neither of the lines 73 or 76 is grounded, and as a result the vertical line 87 of the matrix becomes positive beneath its load resistor, and that positive voltage is transmitted through an associated one of the lower 'OR'-diodes 99 to line 80. After a short delay interval less than one bit cell in length, delay circuit 96 actuates the flip-flop to its lower state, as determined by energization of line 80, and reads out a zero. Also, the output of delay circuit 96 actuates flip-flop 69 by reason of the presence of a signal in line A′, so that that flip-flop is in its higher state and the other flip-flops are in their lower states for the next successive cell, and the coding pattern for the next cell is that defined by output line 72 from flip-flop 69, which pattern does not utilize line A′ as of any significance. Rather, that changed pattern employs line B′ as representative of a one, and line C′ as representative of a zero. Again in the next cell, regardless of which of the input lines A′, B′ or C′ is energized, the coding pattern adopted for the succeeding cell will automatically be one in which the remaining two lines are those employed for representing ones and zeros, and the same line cannot be used in two successive cells.

FIG. 3 represents a variation of the FIG. 1 coding and recording apparatus, in which there are provided instead of the two input lines 17 and 18 a series of several input lines numbered 1, 2, 3, 4, 5, 6 and 7, and in which, instead of the three output lines A, B and C, there are provided a series of such output lines A, B, C, D, E, F, G and H. It may be assumed that outputs in these lines A, B, C, etc. are effective to energize individual oscillators 56′ to supply signals of eight different frequencies respectively to an amplifier 15′ and a recording head 13′. A coding circuit 21′, including a matrix of the general type shown at 21 in FIG. 1, and a number of flip-flops such as those shown at 33, 34, etc., and related circuitry, acts for each incoming data bit, on any of the lines 1, 2, 3, 4, 5, 6 or 7 of FIG. 3, to code that bit as an output on one of the lines A, B, C, D, E, F, G or H. In this connection, it is noted that, as in FIG. 1, the number of output lines is one greater than the number of input lines, so that only seven of the eight output lines are used in the coding pattern for any particular input bit. For example, as seen in FIG. 4, if in one bit cell the output line designated A is energized to represent in coded form a corresponding data bit, then the code pattern adopted by circuitry 21′ of FIG. 3 for the next successive bit cell is that shown in the line designated 104 of FIG. 4. In that code pattern, the output line B is assigned the value of input line 1, while the output line C is assigned the same value or meaning as input line 2, etc. If in the next cell it then happens that an input signal is received on input line 4, an output signal would be produced in output line E, in accordance with the code pattern shown at 104 in FIG. 4, which would result in delivery of a signal of a corresponding predetermined frequency to amplifier 15′ and recording head 13′. For the next successive bit cell, the circuitry 21′ would automatically adopt a changed code pattern such as that shown on line 105 of FIG. 4, in which the output line E is not utilized with any significance, but rather line F represents input line 1, output line G represents input line 2, output line H represents input line 3, etc. If in that cell, an input signal is received on line 6, resulting in an output signal on line C, then in the next bit cell the coding pattern adopted will not utilize line C, but will assign coding significances in accordance with those designated at 106 in FIG. 4. Since it will be apparent from the previous detailed discussion of the FIG. 1 circuitry how the circuitry designated very generally at 21' in FIG. 3 can be constructed, the drawing and description of the present application will not be needlessly lengthened by showing and describing in detail the matrix and other components of the circuitry 21' of FIG. 3.

FIG. 5 is a view similar to FIG. 2, but showing very diagrammatically the manner in which a more complex decoding circuit can be employed for handling a greater number of coded and decoded signals as assumed in FIG. 3. In FIG. 5, the circuitry 75' may be considered as including a matrix of the same general type shown at 75 in FIG. 2, and also including flip-flops such as those shown at 69, 70 and 71, and the other related apparatus of FIG. 2. Instead of the three lines A', B' and C' of FIG. 2, there are substituted a series of lines A', B' and C' etc., one of which is energized for each bit cell. In lieu of the two output lines 79 and 80, there are provided a series of such output lines designated 1, 2, 3, 4, 5, 6 and 7, whose outputs are combined with a clocking pulse from an OR-circuit 95' and delay circuit 96' (corresponding to circuits 95 and 96 of FIG. 2), to actuate AND-circuits 107 for producing ultimate output signals representing the input signals fed into the apparatus of FIG. 3. As in FIG. 3, the lettered lines A', B' etc. are one greater in number than the numbered lines 1, 2, 3, 4, 5, etc., so that one of the lettered lines need not be used in each data cell, and the particular line which is not used is the one on which the previous incoming signal was received. The decoding circuitry 75', like the coding circuitry 21' of FIG. 3, thus automatically adopts for each bit cell a coding pattern requiring a change in state for each such cell. For this reason, the information track can be automatically self-clocking, with the changes in state in lines A, B, C, D, etc., and in lines A', B', C', etc., serving as the clocking signals.

While certain specific embodiments of the present invention have been disclosed as typical, the invention is, of course, not limited to these particular forms, but rather is applicable broadly to all such variations as fall within the scope of the appended claims. For example, the invention in its broadest aspects does not require use of the particular type of coding and decoding matrices shown in the drawings, or the specific circuits illustrated, or that the apparatus be used for writing numeric digits as distinguished from other logical values. Further, as indicated previously, the apparatus need not be employed in a recording environment, but rather may be used in equipment in which the information is first coded and then decoded immediately, without recording, as in telephone transmission. Such a variational arrangement could be produced by merely introducing the output of amplifier 15 in FIG. 1 directly into line 162 from amplifier 62 in FIG. 2, or by similarly connecting the output from amplifier 15' in FIG. 3 to an input circuit leading into the apparatus of FIG. 5. These variations will of course be apparent without specific illustration in the drawings. Additionally, instead of the discussed type of change in state by frequency modulation, any other convenient set of electrical, magnetic or other states may be employed for representing the data bits in coded form.

I claim:

1. Data processing apparatus comprising input means for receiving a series of data input signals of two or more different types in successive data cells, output means for representing said input signals in coded form and actuable between three or more different significant states, and coding means responsive to said input signals to actuate said output means to said different states in accordance with a number of different code patterns each utilizing a selected plurality but not all of said states of the output means to represent said different types of input signals respectively, said coding means being operable in each of said cells to adopt a coding pattern which does not utilize to represent any of said types of input signals the same state of said output means actually produced in the preceding cell, said coding means including a switching matrix having input lines some of which receive said input signals, a plurality of flip-flops having outputs connected to additional ones of said input lines of said matrix and adapted when actuated to predetermined states to condition the matrix for use of said different code patterns respectively, means operable upon actuation of said output means to any particular one of said different states respectively to cause a corresponding one of said flip-flops to adopt a code pattern for the next cell which does not utilize said particular one of the states, and means responsive to each input signal received to apply a delayed clocking signal to all of said flip-flops in a relation actuating them in delayed relation to each input signal to adopt a changed code pattern.

2. Data processing apparatus comprising input means for receiving a series of data input signals of two or more different types in successive data cells, output means for representing said input signals in coded form and actuable between three or more different significant states, and coding means responsive to said input signals to actuate said output means to said different states in accordance with a number of different code patterns each utilizing a selected plurality but not all of said states of the output means to represent said different types of input signals respectively, said coding means being operable in each of said cells to adopt a coding pattern which does not utilize to represent any of said types of input signals the same state of said output means actually produced in the preceding cell, said coding means including a switching matrix having input lines some of which receive said input signals, a plurality of flip-flops having outputs connected to additional ones of said input lines of said matrix and adapted when actuated to predetermined states to condition the matrix for use of said different code patterns respectively, means operable upon actuation of said output means to any particular one of said different states respectively to cause a corresponding one of said flip-flops to adopt a code pattern for the next cell which does not utilize said particular one of the states, and means responsive to each input signal received to apply a delayed clocking signal to all of said flip-flops in a relation actuating them in delayed relation to each input signal to adopt a changed code pattern, said output means including means for producing signals of predetermined different frequencies in said different states respectively, there being a magnetic recording head responsive to said different frequencies to produce corresponding changes in frequency modulation of an alternating magnetic record on a record track.

* * * * *